(12) United States Patent
Eckert et al.

(10) Patent No.: US 8,886,934 B2
(45) Date of Patent: Nov. 11, 2014

(54) AUTHORIZING PHYSICAL ACCESS-LINKS FOR SECURE NETWORK CONNECTIONS

(75) Inventors: Toerless Eckert, Mountain View, CA (US); Brian E. Weis, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1603 days.

(21) Appl. No.: 11/460,198

(22) Filed: Jul. 26, 2006

(65) Prior Publication Data
US 2008/0028225 A1 Jan. 31, 2008

(51) Int. Cl.
*H04L 29/06* (2006.01)

(52) U.S. Cl.
CPC .......... *H04L 63/164* (2013.01); *H04L 63/0869* (2013.01); *H04L 63/0272* (2013.01)
USPC ........................................................ 713/168

(58) Field of Classification Search
CPC ...... H04L 63/08; H04L 563/10; H04L 63/164
USPC ................................. 726/1–21; 713/151–172
See application file for complete search history.

(56) References Cited

U.S. PATENT DOCUMENTS

| | | | | |
|---|---|---|---|---|
| 5,056,140 | A * | 10/1991 | Kimbell | 713/155 |
| 5,828,751 | A * | 10/1998 | Walker et al. | 713/175 |
| 6,032,259 | A * | 2/2000 | Nemoto | 726/3 |
| 6,076,163 | A * | 6/2000 | Hoffstein et al. | 713/168 |
| 6,226,752 | B1 * | 5/2001 | Gupta et al. | 726/9 |
| 7,188,245 | B2 * | 3/2007 | Isozaki et al. | 713/171 |
| 7,418,267 | B2 * | 8/2008 | Karaoguz | 455/456.1 |
| 7,510,580 | B2 * | 3/2009 | Zakaria | 726/35 |
| 8,181,262 | B2 * | 5/2012 | Cooper et al. | 726/28 |
| 8,387,106 | B2 * | 2/2013 | Karaoguz et al. | 725/148 |
| 2002/0049914 | A1 * | 4/2002 | Inoue et al. | 713/201 |
| 2002/0084655 | A1 * | 7/2002 | Lof et al. | 290/44 |
| 2003/0014521 | A1 * | 1/2003 | Elson et al. | 709/225 |
| 2003/0018524 | A1 * | 1/2003 | Fishman et al. | 705/14 |
| 2003/0070067 | A1 * | 4/2003 | Saito | 713/150 |
| 2003/0108205 | A1 * | 6/2003 | Joyner et al. | 380/277 |
| 2003/0177384 | A1 * | 9/2003 | Jones et al. | 713/201 |
| 2004/0030887 | A1 * | 2/2004 | Harrisville-Wolff et al. | 713/155 |
| 2004/0117818 | A1 * | 6/2004 | Karaoguz et al. | 725/31 |
| 2004/0123153 | A1 * | 6/2004 | Wright et al. | 713/201 |
| 2005/0120223 | A1 * | 6/2005 | Kiwimagi et al. | 713/182 |
| 2005/0120240 | A1 * | 6/2005 | Kiwimagi et al. | 713/201 |
| 2005/0235363 | A1 * | 10/2005 | Hibbard et al. | 726/28 |
| 2013/0174230 | A1 * | 7/2013 | Karaoguz et al. | 726/4 |

OTHER PUBLICATIONS

Schneier, "Applied Crytography Second Edition", 1996, John Wiley & Sons, pp. 34-38.*
TRA, "Understanding IP Network Security", 2005, TRA.*
Denning, "Location-Based Authentication Grounding Cyberspace for Better Security", Feb. 1996, Computer Fraud & Security.*

(Continued)

*Primary Examiner* — Bradley Holder

(57) ABSTRACT

A method of authenticating a network link of a first device to a second device is described. The method includes communicating a challenge request including a challenge value from the first device to the second device, wherein challenge value is unique to the challenge request. The method further includes receiving a challenge response from the second device, in which the challenge response includes encrypted data pertaining to the first device, and authenticating the network link based on the first device decrypting the encrypted data included in the challenge response from the second device.

6 Claims, 6 Drawing Sheets

(56) References Cited

OTHER PUBLICATIONS

Schneier "Applied Cryptography", 1996, p. 37.*
Voydock et al.; Security Mechanisms in High-Level Network Protocols; Published in: Journal ACM Computing Surveys (CSUR) Surveys Homepage archive; vol. 15 Issue 2; Jun. 1983; pp. 135-171; ACM Digital Library.*
Sanzgiri et al.; A secure routing protocol for ad hoc networks; Published in: Network Protocols, 2002. Proceedings. 10th IEEE International Conference on; Nov. 12-15, 2002; pp. 1-10; IEEE Xplore.*

* cited by examiner

AUTHORIZING PHYSICAL ACCESS-LINKS FOR SECURE NETWORK CONNECTIONS

FIELD

This application relates to a method and system for authorizing physical access-links for secure network connections by authenticating, according to one embodiment, an access device and its access-link to a network.

BACKGROUND

More and more enterprises are allowing remote connectivity to their internal networks. This service provides employees and other permitted users the ability to login and use the enterprise's network. This may be particularly useful for telecommuting employees and regular employees who occasionally need to work from their homes or simply need to check their email. Typically, this service is provided by a user logging into the system and creating a VPN (virtual private network). A VPN is a private communications network usually used within a company, or by several different companies or organizations, to communicate over a public network. VPN message traffic is carried on public networking infrastructure (e.g., the Internet) using standard (often insecure) protocols, or over a service provider's network providing VPN service guarded by well defined Service Level Agreement (SLA) between the VPN customer and the VPN service provider.

There are two VPN types, trusted VPNs and secure VPNs. Secure VPNs (SVPNs) use cryptographic tunneling protocols to provide the necessary confidentiality (e.g., to prevent snooping), sender authentication (e.g., to prevent identity spoofing), and message integrity (e.g., to prevent message alteration) to achieve the privacy intended. Secure VPN technologies may also be used to enhance security as a "security overlay" within dedicated networking infrastructures. Secure VPN protocols include the following, IPsec (IP security); SSL (secure socket layer) used either for tunneling the entire network stack; and PPTP (point-to-point tunneling protocol).

Trusted VPNs do not use cryptographic tunneling, and instead rely on the security of a single provider's network to protect the traffic. Multi-protocol label switching (MPLS) is commonly used to build trusted VPNs. Other protocols for trusted VPNs include, L2F (layer 2 Forwarding); L2TP (layer 2 Tunneling Protocol); and L2TPv3 (layer 2 Tunneling Protocol version 3).

Layer 2 (L2) is the data link layer of the seven-layer OSI (Open Systems Interconnection) model. L2 responds to service requests from the network layer, issues service requests to the physical layer, and provides the functional and procedural means to transfer data between network entities and to detect and possibly correct errors that may occur in the physical layer. L3 (layer 3) is the network layer and provides functional and procedural means of transferring variable length data sequences from a source to a destination via one or more networks while maintaining the quality of service requested by the transport layer. The Network layer performs network routing, flow control, segmentation/desegmentation, and error control functions. Routers and switches may operate at this layer, sending data throughout the extended network (e.g., the Internet). A well known example of a L3 protocol is the Internet Protocol (EP).

Returning to VPN solutions, in a L2 trusted VPN solution, the client has an access-router that has an L2 connection, for example a DSL/ATM-PVC connected directly into a headend router in the VPN headend. One of the specific security properties of a layer 2 VPN solution is that it is physically fixed with respect to location due to the explicitly provisioned L2 connection.

When a L2 solution is replaced with a L3 (layer 3) secure VPN, such as an IPsec based VPN, a home router has a "standard" Internet connection and builds an IPsec (communications) tunnel across that Internet connection back to the VPN headend router. In this solution, the physical location of the VPN access router is no longer fixed, but can be essentially located anywhere in the world. However, the fact that the location of the VPN access router in an L3 solution cannot be validated like a L2 solution raises security concerns.

This security concern can be addressed in a L3 solution by requiring the "authentication-proxy" functionality on the VPN access-router. This function inhibits any traffic from a device, such as a CPE (customer premises equipment) device, across the IPsec tunnel initially and redirects any Web/HTTP connections from the device to a server where a web-page is brought up on the CPE-device to authenticate the device/user. Once that authentication is successful, the VPN access router passes further traffic to and from the authenticated device unconstrained across the EPsec tunnel.

However, the "authentication-proxy" based approach is unusable for CPE devices other than locally-operated end-user devices with web-browser capability. If any end-user device has to be operated remotely (e.g., from behind the IPsec tunnel), or if it does not have local-web-server capabilities, or if the usage profile is such that it needs to be available (e.g., after a reboot of the VPN access-router) before a user can authorize, then that device becomes effectively unusable in the context of a changed service offering.

BRIEF DESCRIPTION OF THE DRAWINGS

The present embodiments of the invention are illustrated by way of example, and not by way of limitation, in the figures of the accompanying drawings in which.

DETAILED DESCRIPTION

Although an embodiment of the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

In one embodiment, to establish a secure tunnel between a gateway and a headend, an encrypted string is provided in a response from an access provider's network access device to the gateway. This provides a cryptographically secure way to allow the gateway that is fed with two pre-existing pieces of information, the expected gateway location and the public key of the access provider, to verify the response from the access device is valid and authenticate the physical link between the two devices.

Figure 1:
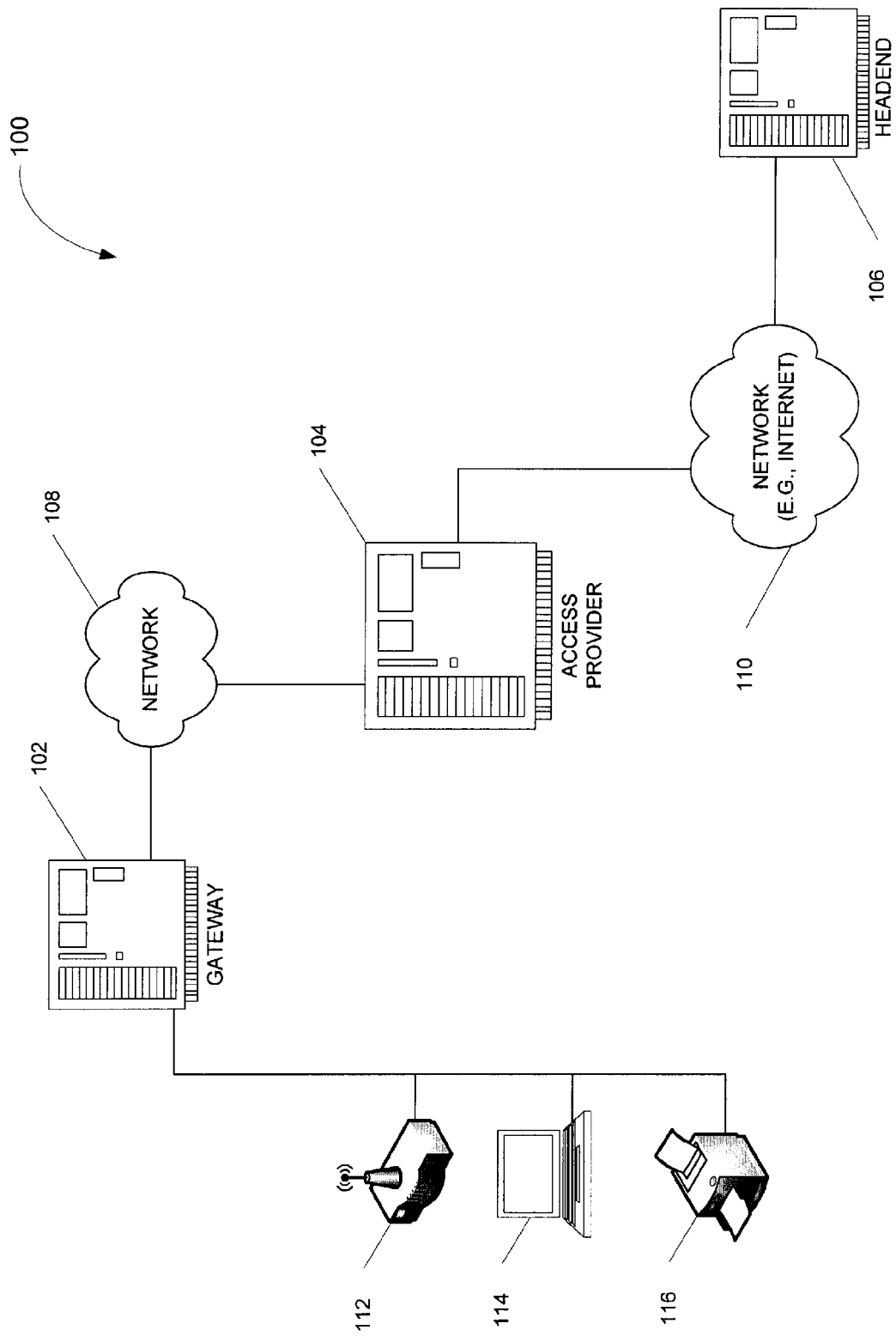
FIG. 1 illustrates and example embodiment of a VPN (virtual private network) system configured to provide a secure connection between a gateway and a headend over a layer 3 architecture.

FIG. 1 illustrates an example embodiment of a VPN (virtual private network) system 100 configured to provide a secure connection between a gateway and a headend over a layer 3 architecture. The connection may be secured in part by authenticating the physical location of the gateway within the layer 3 architecture.

In one embodiment, the VPN system 100 includes a gateway 102, an access provider 104, and a headend 106. The gateway 102 (e.g., a VPN access-router) may be connected to the access provider 104 via a L3 (layer 3) connection over a network 108. The headend 106 may be connected to the access provider 104 via a layer 3 connection over a network 110 (e.g., the Internet). The gateway 102 may include a multitude of attached devices, for example, a wireless router 112, a laptop 114, and a printer 116. In various embodiments, the access provider 104 may be a single device or one or more devices communicatively coupled to provide the functionality described herein.

In one embodiment, the gateway 102 in authenticating its physical connection or link to the access provider 104 first requests a connection from the access provider 104 via a standard protocol, such as by DHCP (dynamic host configuration protocol). After communication has been established (e.g., an IP (Internet protocol) address has been assigned the gateway 102), the gateway 102 sends a message to the access provider 104 including data to authenticate the link (connection). The access provider 104 responds with an encrypted return message including the original message and a link identifier. The gateway 102 decrypts the message based on an access provider key to verify the return message contents and authenticate the link. Once the link is authenticated between the gateway 102 and the access provider 104, the link (or tunnel) is created between the headend 106 and the gateway 102. A more detailed discussion of the messaging is provided below.

Utilizing an embodiment that authenticates the physical location of the link using the methods described herein provides greater flexibility for devices used behind the gateway 102. For example, traditionally a link may be verified as being associated with a valid person (not a valid location) based on a user login, such as by a web interface. However, by validating the security of the connection by authenticating the location of the access provider 104 with respect to the gateway 102, the devices such as the printer 116 may have access to the headend 106 via the secure tunnel without having to provide login information based on user authentication data (e.g., user name and password via a web application, etc.).

Figure 2:
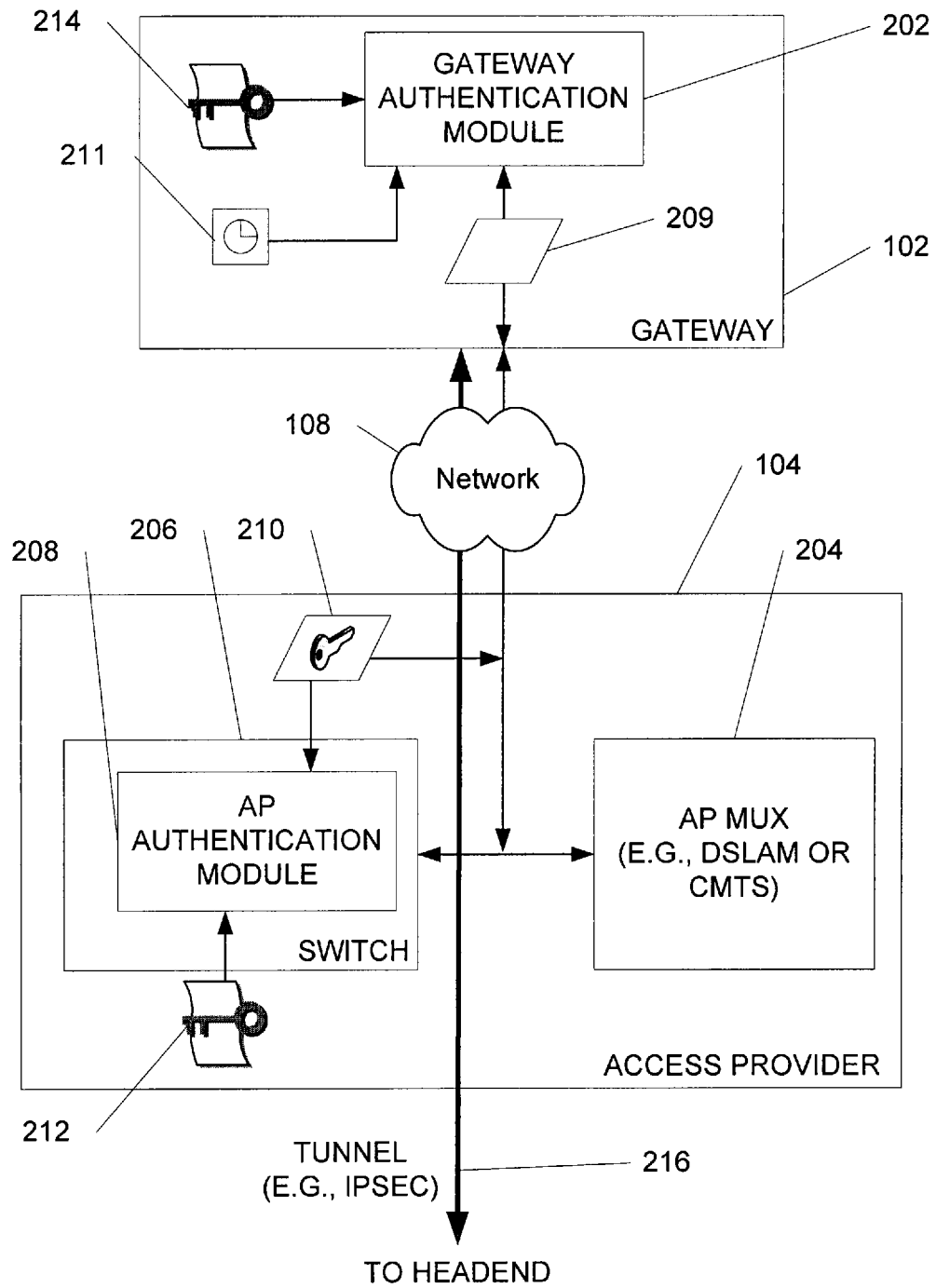
FIG. 2 illustrates a diagram of an example embodiment of the gateway and the access provider including their respective modules to facilitate the authentication of the gateway link and physical location.

FIG. 2 illustrates a diagram of an example embodiment of the gateway 102 and the access provider 104 including their respective modules to facilitate the authentication of the gateway 104's link and physical location. The gateway 102 includes a gateway authentication module 202 and as discussed with respect to FIG. 1, is in communication with access provider 104 via the network 108.

The access provider 104 includes an AP MUX (access provider multiplexer) 204 and a switch 206. In various embodiments, the AP MUX 204 may be a multiplexer associated with a cable network provider (e.g., a cable modem termination system—CMTS) or with a digital subscriber line provider (e.g., a DSL access multiplexer—DSLAM). The AP MUX 204 may also be in communication with other elements with access provider 104, such as the switch 206. The switch 206 may include an AP authentication module 208 to authenticate, along with the gateway authentication module 202, the physical link to the gateway 102. Algorithms associated the gateway authentication module 202 and the AP authentication module 208 may identify and verify packets from the gateway 102 actually came across the expected physical link. In another embodiment, the AP MUX 204 includes the AP authentication module 208 and the associated algorithms. In other embodiments, the AP authentication module 208 may be in any other trusted component associated with the access provider 104 and still perform the functions associated with authenticating the physical link.

In a series of communication exchanges, according to one embodiment, the gateway authentication module 202 and the AP authentication module 208 initially exchange data, including encrypted data, to authenticate the physical connection. This may be accomplished by sending request data 209 in a challenge request (e.g., a link identification request) from the gateway 102 to the AP authentication module 208. The request data 209 may include a unique value 211 that may be used in a challenge-response query that will be returned in a challenge response from the access provider 104, such as a time stamp from a clock accessible by the gateway 102. In one embodiment, the AP authentication module 208 replies with the challenge response, which includes encrypted data 210 composed of, inter alia, the received request data 209, including the unique value 211 and link identification data. The encrypted data 210 is then received and verified by the gateway authentication module 202.

In one embodiment, the AP authentication module 208 uses a pair of cryptographic keys, which includes a private key 212 to encrypt the data and an associated public key 214 used by the gateway authentication module 202 to decrypt and verify the received encrypted data 210, thus authenticating the link to the access provider 104. After the link has been authenticated, the gateway 102 may then establish a communication link via a secure tunnel 216 (e.g., VPN/IPsec) from the gateway 102 to the headend 106. It can be appreciated by those skilled in the art that a multitude of encryption techniques may be used without departing from the broad spirit of the embodiments described herein.

Figure 3:
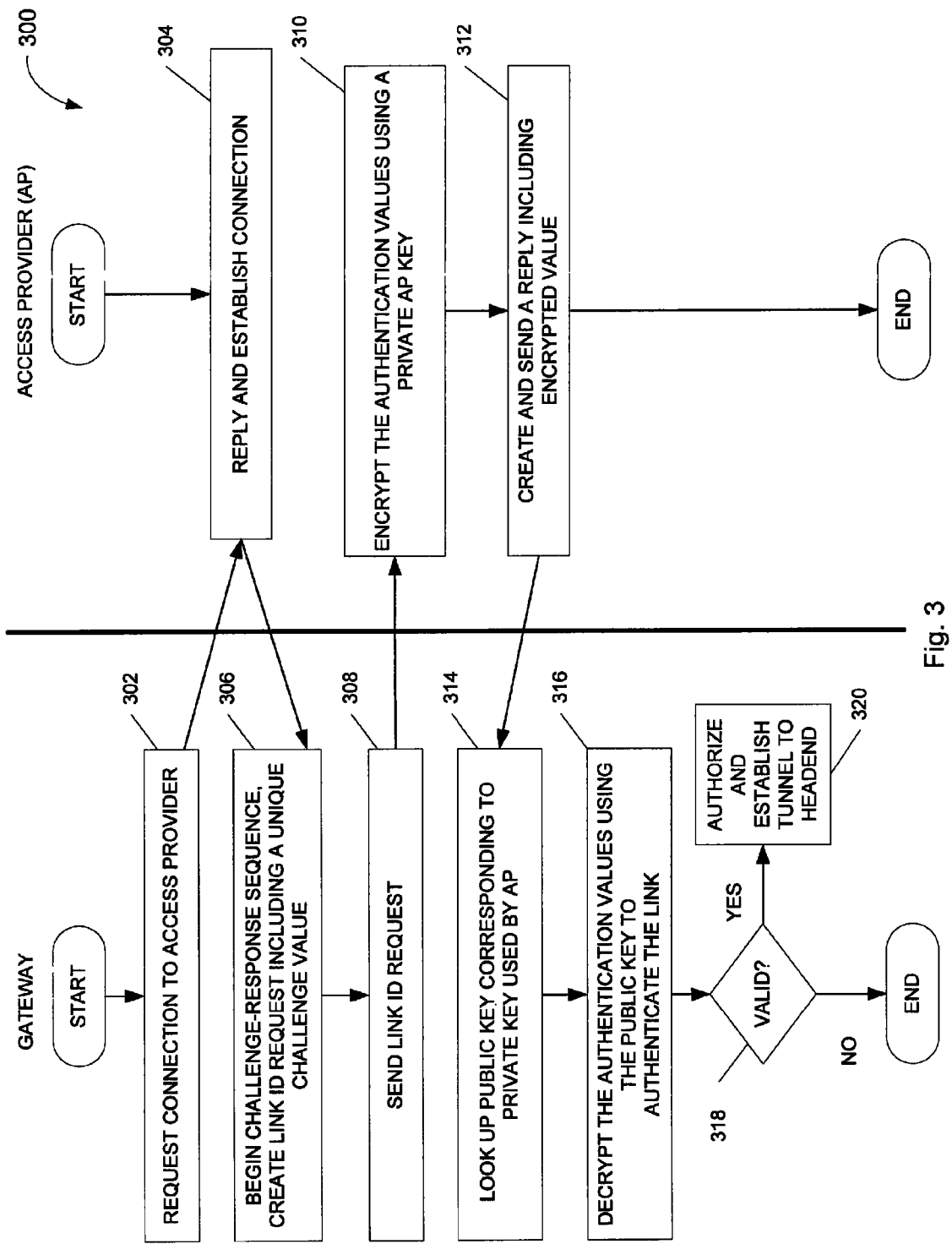
FIG. 3 is a flowchart illustrating an example embodiment of basic communication between the gateway and the access provider to authenticate the physical link between the devices.

FIG. 3 is a flowchart 300 illustrating an example embodiment of basic communication between the gateway 102 and the access provider 104 to authenticate the physical link between the devices. In one embodiment, a location identifier (e.g., a character string) is provided that identifies the location and with sufficient authentication acts as a verification signature between the gateway 102 and the access provider 104. The following operations illustrate an example embodiment of this process.

At operation 302, the gateway 102 requests a connection to the access provider 104. In one embodiment, the message is a standard DHCP message to obtain an IP (Internet protocol) address. The access provider 104 responds, at operation 304, with an IP address for the gateway 102 and establishes a basic communications link.

For security purposes, such as to prevent replay attacks, the gateway 102 uses a challenge-response mechanism to securely communicate and exchange connection authentication data (e.g., a physical link identifier). A replay attack is a form of network attack in which a valid data transmission is maliciously or fraudulently repeated or delayed. This is carried out by an adversary who intercepts the data and retransmits it, possibly as part of a masquerade attack. For example, the adversary intercepts data associated with a user's login and later replays that data in an attempt to login as the user.

Returning to the flowchart 300, in using the challenge-response mechanism, the gateway 102 may begin the challenge-response, at operation 306, by generating a link identification request (e.g., request data 209) including a challenge request composed of a unique value (e.g., unique value 211), such as a time stamp or a random number, and sending the challenge request to the access provider 104 at operation 308. In one embodiment, the link identification request is a DHCP option created for generating the link identification request.

The access provider 104, at operations 310 and 312, may receive the link identification request and in response, generate a challenge response (e.g., encrypted data 210) composed of authentication values which may include the link identifier (e.g., a string value of the location), and the unique value (e.g., unique value 211). The encrypted data is encrypted (at operation 310) with a private key (e.g., the private key 212). In other embodiments, other values may also be encrypted (e.g., a key identifier) and a hash of the unencrypted data may be cryptographically signed and returned instead of encrypted data. Additionally, a cryptographically signed certificate containing the access provider's public key may be returned with the encrypted or signed data. At operation 314, the gateway looks up the public key (e.g., public key 214) corresponding to private key used by the access provider 104 to encrypt the values. Alternatively, the public key may come from the access provider's cryptographically signed certificate. At operation 316, the gateway decrypts the encrypted data. At operation 318, the validity of the authentication values are checked. If verified, the physical link is authenticated at operation 320, and gateway 102 communicates with the headend 106 to establish the communication tunnel.

In one embodiment, the access provider 104 uses a DHCP server/proxy function to generate a DHCP reply for the link identification request. The link identifier may be a 16 byte string that identifies the access-link by whatever enumeration scheme the access provider 104 uses. The challenge value may be a 64 bit value and a key identifier may be a one byte number indicating which private key is being used to encrypt the data. As discussed above, the encrypted data may include authentication values including the link identifier and the challenge value, where the authentication values are encrypted with the private key of the access provider 104.

In one embodiment, the gateway 102, prior to communicating with the access provider 104, receives and stores one or more public keys associated with their respective one or more private key identifiers and the location identifier associated with the physical location of the gateway 102. The access provider 104, at operations 310 creates a cryptographic signature by hashing the location identifier and the unique value (e.g., unique value 211) in the challenge and then encrypting the hash with a private key. The gateway 102 receives the challenge response from the access provider 104. At operation 314, the gateway 102 uses the key identifier to look up the public key (e.g., public key 214) corresponding to private key used by the access provider 104 to encrypt the hash. Then at operation 316, the gateway 102 decrypts the hash. At operation 318, the locally stored authentication values are hashed and the resulting hash is compared to the decrypted hash value. If verified, the physical link is authenticated and the communication tunnel (e.g., EPsec VPN tunnel) is authorized at operation 320 and gateway 102 communicates with the headend 106 to establish the communication tunnel.

Figure 4:
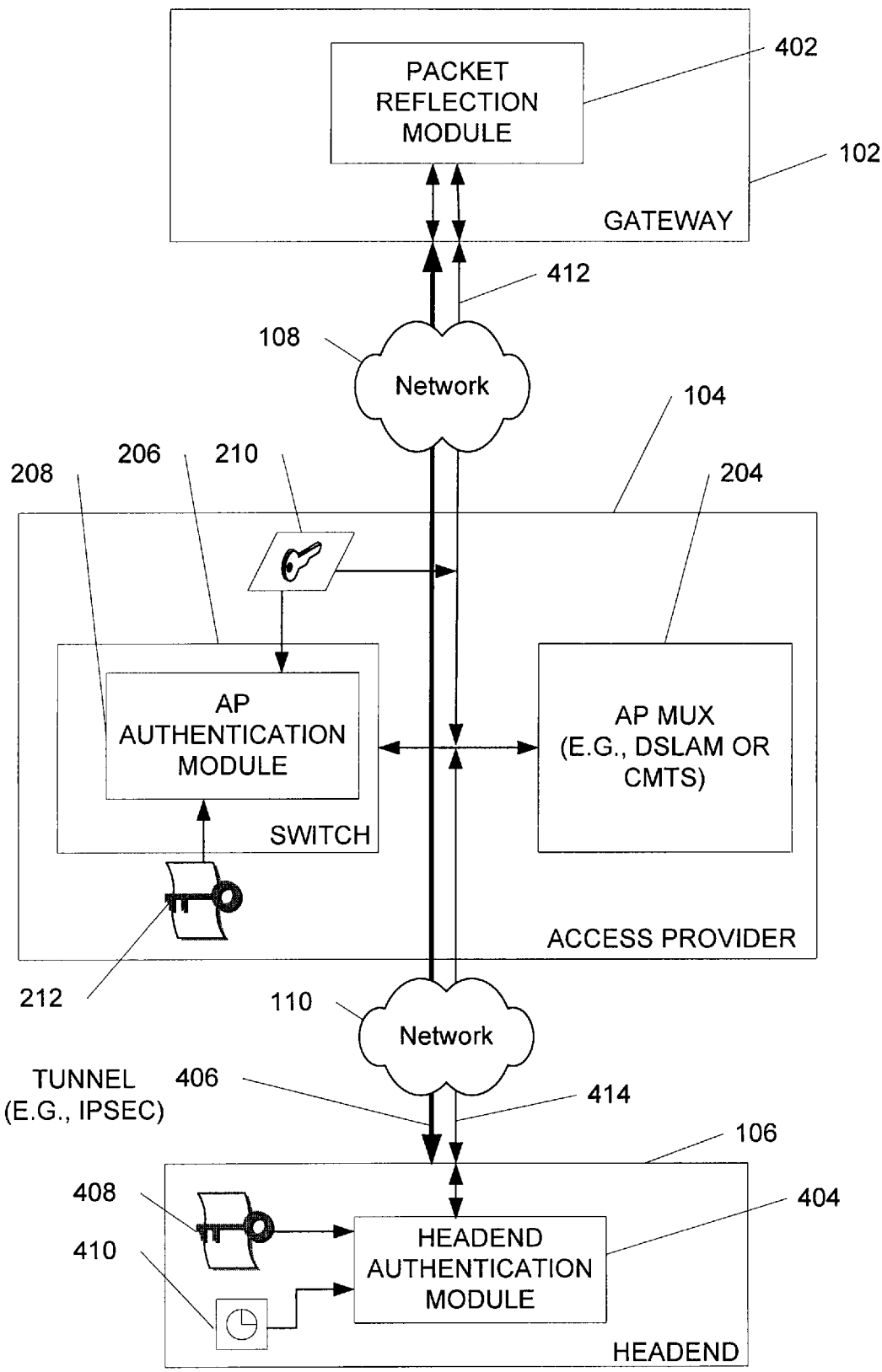
FIG. 4 illustrates a diagram of an example embodiment of another configuration for authenticating the gateway's link and physical location with respect to the access provider.

FIG. 4 illustrates a diagram of an example embodiment of another configuration for authenticating the gateway 104's link and physical location with respect to the access provider 104. FIG. 4 primarily includes the same components of FIG. 2. However, FIG. 4 includes a packet reflection module 402 in gateway 102 and a headend authentication module 404, which in this embodiment, replaces the gateway authentication module 202.

In example embodiment, the communication tunnel 406 is established between the gateway 102 and the headend 106 prior to authentication. However, because it is prior to authentication the headend 106 would not yet allow regular communications (e.g., data packets) between the devices. In other words, the connection is brought up but the headend authentication module 404, according to one embodiment, includes a packet filter to prevent regular communications until authentication.

After the communication tunnel 406 is established, the headend authentication module 404, uses a challenge-response mechanism, similar to what is described with respect to FIG. 2 and FIG. 3, to send a challenge packet, such as a link identification request (e.g., request data 209) including a challenge value, such as the unique value 410. The packet reflection module 402 reflects the challenge packet back into the network to the AP authentication module 208 of the access provider 104, but using a standard network connection 412 and not the communication tunnel 406. With respect to this embodiment, to the access provider 104, it appears the gateway 102 is sending the challenge packet similar to what is described with respect to FIG. 2 and FIG. 3.

The AP authentication module 208 sends a cryptographic response to the challenge, such as a challenge response (e.g., encrypted data 210) composed of authentication values including the link identifier (e.g., a string value of the location) and the challenge value (e.g., unique value 211 as described with respect to FIG. 2 and FIG. 3. In another embodiment, an unencrypted key identifier (not shown) may also be included. The packet reflection module 402 may then relay the response back to the headend authentication module 404 via the communication tunnel 406. In another embodiment, the cryptographic response is relayed via the standard network connections 412 and 414.

The headend authentication module 404 receives the cryptographic response, looks up the public key 408 corresponding to the key identifier (if included), and decrypts and verifies any encrypted data, such as the challenge value, against the expected data. After the link has been verified and authenticated, the headend authentication module 404 disable the packet filter and begin standard communication with the gateway 102 via the communication tunnel 406 (e.g., VPN/IPsec). In other embodiments, the access provider may return a cryptographically signed hash of the challenge and location information instead of encrypted data.

Figure 5:
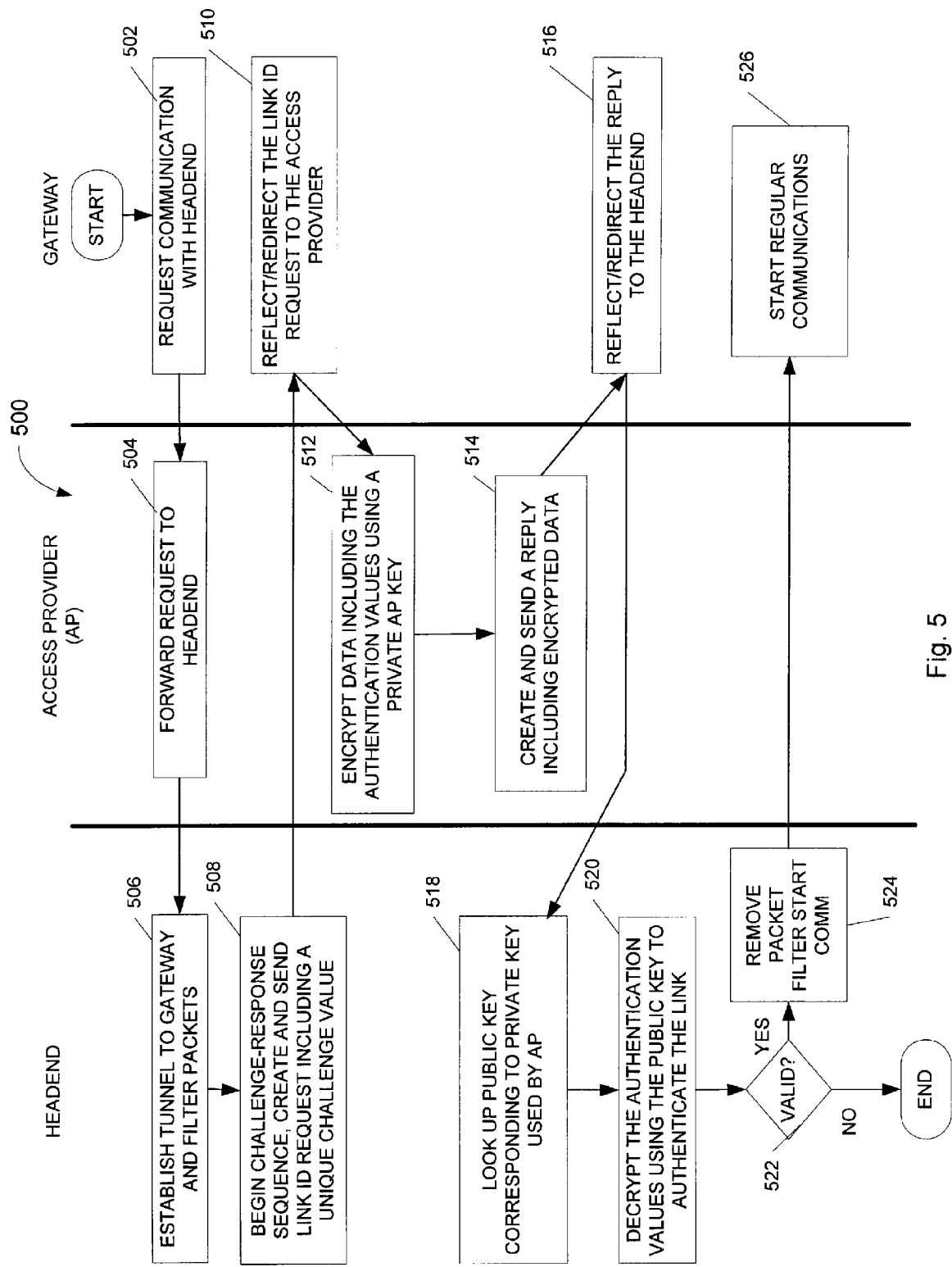
FIG. 5 is a flowchart illustrating an example embodiment of basic communication between the headend, the gateway and the access provider to authenticate the physical link between the gateway and the access provider.

FIG. 5 is a flowchart 500 illustrating an example embodiment of basic communication between the headend 106, the gateway 102 and the access provider 104 to authenticate the physical link between the gateway 102 and the access provider 104. At operation 502, the gateway requests network communication (e.g., a link) with the headend 106 via the access provider 104. At operation 504, the access provider 104 forwards the request to the headend 106. Upon receipt, the headend 106 accepts the request, establishes the tunnel (e.g., VPN/IPsec) but filters all packets to prevent unsecured communications between the gateway 102 and the headend 106.

The headend creates and sends, at operation 508, a challenge request including a link identification request which includes a unique challenge value, via the tunnel to the gateway 102. The gateway 102 then reflects or redirects, at operation 510, the link identification request to the access provider 104 via a conventional network link (e.g., not the established tunnel). At operation 512, the access provider 104 encrypts data (see accompanying description of FIG. 3) which includes a link identifier and a challenge value encrypted with a private key of the access provider 104. A challenge response is created including the encrypted data from operation 512 and sent back to the gateway 102 at operation 514. The gateway 102 at operation 516, redirects the challenge response back to the headend 106. At operation 518, the headend 106 decrypts the authentication values and the link identifier, at operation 520, using a public key (e.g., public key 408) corresponding to the key identifier included in the challenge response. At operation 522, if the link identifier is valid and the link authenticated, the headend 106, at operation 524, removes the packet filter to start standard communications, at operation 526, with the gateway 102 via the previously established tunnel from operation 506.

Figure 6:
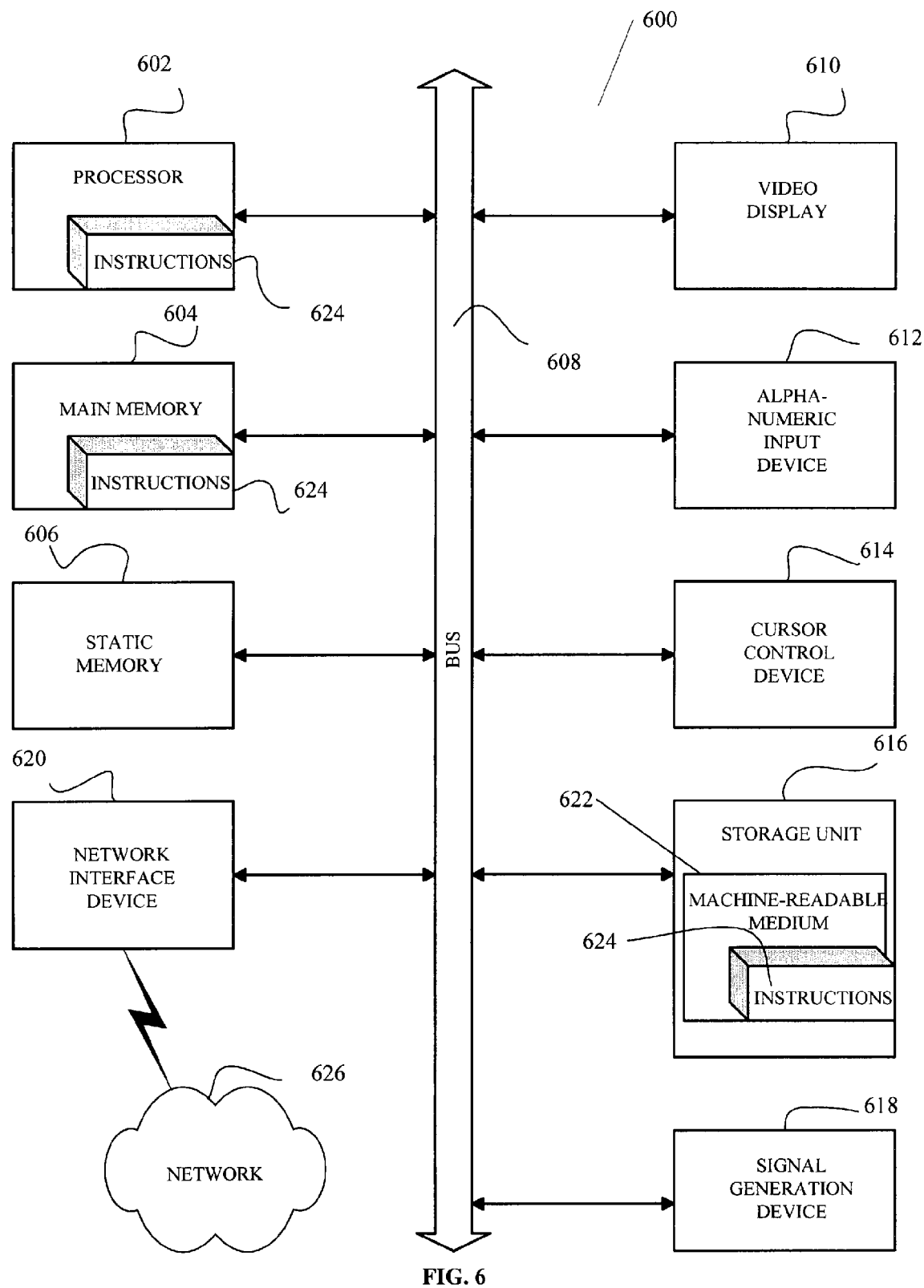
FIG. 6 shows a diagrammatic representation of machine in the example form of a computer system within which a set of instructions, for causing the machine to perform any one or more of the methodologies discussed herein, may be executed.

FIG. 6 shows a diagrammatic representation of machine in the example form of a computer system 600 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term machine shall also be taken to include any collection of machines that individually or jointly execute a set (or multiple sets) of instructions to perform any one or more of the methodologies discussed herein.

The example computer system 600 includes a processor 602 (e.g., a central processing unit (CPU), a graphics processing unit (GPU) or both), a main memory 604 and a static memory 606, which communicate with each other via a bus 608. The computer system 600 may further include a video display unit 610 (e.g., a liquid crystal display (LCD) or a cathode ray tube (CRT)). The computer system 600 also includes an alphanumeric input device 612 (e.g., a keyboard), a user interface (UI) navigation device 614 (e.g., a mouse), a disk drive unit 616, a signal generation device 618 (e.g., a speaker) and a network interface device 620.

The disk drive unit 616 includes a machine-readable medium 622 on which is stored one or more sets of instructions and data structures (e.g., software 624) embodying or utilized by any one or more of the methodologies or functions described herein. The software 624 may also reside, completely or at least partially, within the main memory 604 and/or within the processor 602 during execution thereof by the computer system 600, the main memory 604 and the processor 602 also constituting machine-readable media.

The software 624 may further be transmitted or received over a network 626 via the network interface device 620 utilizing any one of a number of well-known transfer protocols (e.g., HTTP).

While the machine-readable medium 622 is shown in an example embodiment to be a single medium, the term machine-readable medium should be taken to include a single medium or multiple media (e.g., a centralized or distributed database, and/or associated caches and servers) that store the one or more sets of instructions. The term machine-readable medium shall also be taken to include any medium that is capable of storing, encoding or carrying a set of instructions for execution by the machine and that cause the machine to perform anyone or more of the methodologies of the present invention, or that is capable of storing, encoding or carrying data structures utilized by or associated with such a set of instructions. The term machine-readable medium shall accordingly be taken to include, but not be limited to, solid-state memories, optical and magnetic media.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

We claim:

1. A method comprising:
communicating a challenge request including a challenge value from a first device to a second device over a physical link in an open systems interconnection model (OSI) layer three architecture, the challenge value being unique to the challenge request;
receiving, from the second device, a challenge response including encrypted data pertaining to the first device, the encrypted data including a link identifier identifying the physical link based on a physical location of the first device with respect to the physical link, wherein at least a portion of the challenge response is encrypted using a private key associated with the second device to create the encrypted data, and wherein the challenge response includes the challenge value received from the challenge request and a hash value;
decrypting the encrypted data included in the challenge response from the second device; and
authenticating, using one or more hardware processors, a secure connection associated with the physical link in the (OSI) layer three architecture, by authenticating the link identifier identifying the physical link, based on an expected link identifier, wherein the authenticating includes decrypting the encrypted portion of the challenge response using a public key associated with the private key.

2. The method of claim 1, wherein after authenticating the physical link, creating a virtual private network tunnel between the first device and a third device, wherein the third device is communicatively coupled to the second device.

3. The method of claim 1, wherein the link identifier is a string value.

4. A system comprising:
a gateway authentication module implemented by one or more hardware processors and configured to communicate a challenge request including a challenge value from a gateway to an access provider device, which is comprised of hardware and/or software, over a physical link of an open systems interconnection model (OSI) layer three connection, the challenge value unique to the challenge request;
the gateway authentication module to receive, from an access provider authentication module, which is comprised of hardware and/or software, of the access provider device, a challenge response including encrypted data pertaining to the gateway, the encrypted data including a link identifier identifying the physical link based on a physical location of the gateway with respect to the physical link, wherein the access provider authentication module is configured to encrypt at least a portion of the challenge response using a private key associated with the access provider device to create the encrypted data, and wherein the challenge response created by the access provider authentication module includes the challenge value received from the challenge request and a hash value; and
the gateway authentication module to decrypt the encrypted data included in the challenge response and to authenticate a secure connection associated with the physical link of the (OSI) layer three connection, by authenticating the link identifier identifying the physical link, based on an expected link identifier, wherein the gateway authentication module is further configured to decrypt the encrypted portion of the challenge response using a public key associated with the private key.

5. The system of claim 4, wherein after authentication, the access provider device to create a virtual private network tunnel between the gateway and a headend.

6. A non-transitory machine-readable medium embodying instructions which, when executed by a processor, cause the processor to:
communicate a challenge request including a challenge value from a first device to a second device over a physical link of an open systems interconnection model (OSI) layer three connection, the challenge value unique to the challenge request;
receive, from the second device, a challenge response including encrypted data pertaining to the first device, the encrypted data including a link identifier identifying the physical link based on a physical location of the first device with respect to the physical link, wherein at least a portion of the challenge response is encrypted using a private key associated with the second device to create the encrypted data, and wherein the challenge response includes the challenge value received from the challenge request and a hash value;
decrypt the encrypted data included in the challenge response; and
authenticating a secure connection associated with the physical link of the (OSI) layer three connection, by authenticating the link identifier identifying the physical link, based on an expected link identifier, wherein the authenticating includes decrypting the encrypted portion of the challenge response using a public key associated with the private key.

* * * * *